Oct. 25, 1932.  W. L. WRIGHT ET AL  1,884,952
HOOD CAPPING CONTAINER
Filed May 9, 1929   12 Sheets-Sheet 6
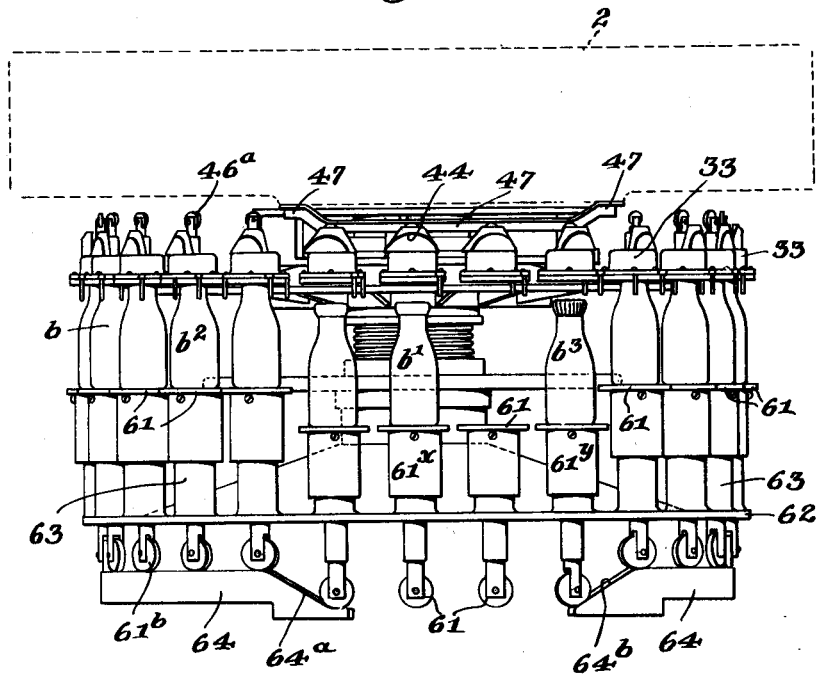
Inventors
W. L. Wright
L. L. Pierce
By
Hubert E. Peck  Attorney

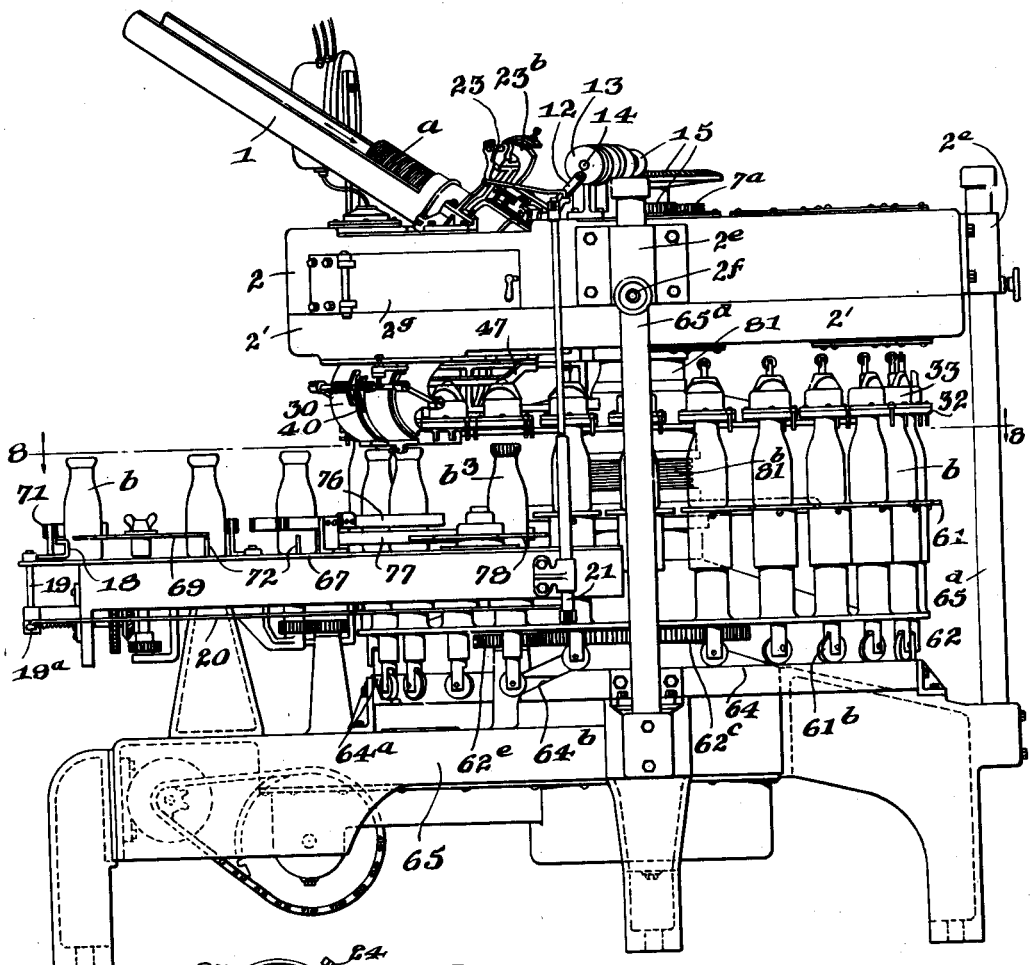

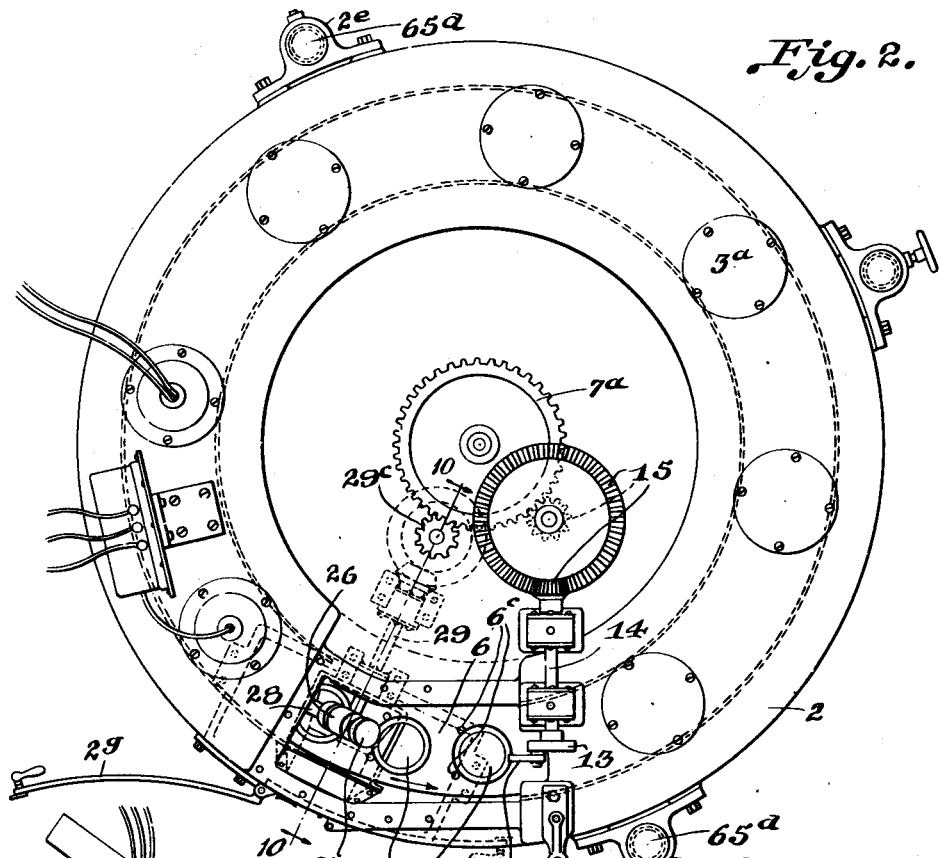
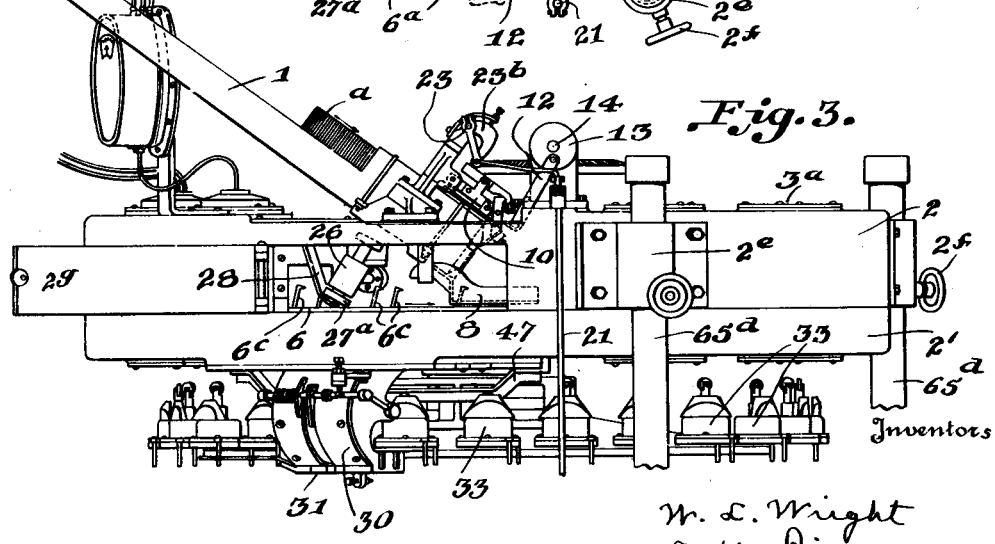

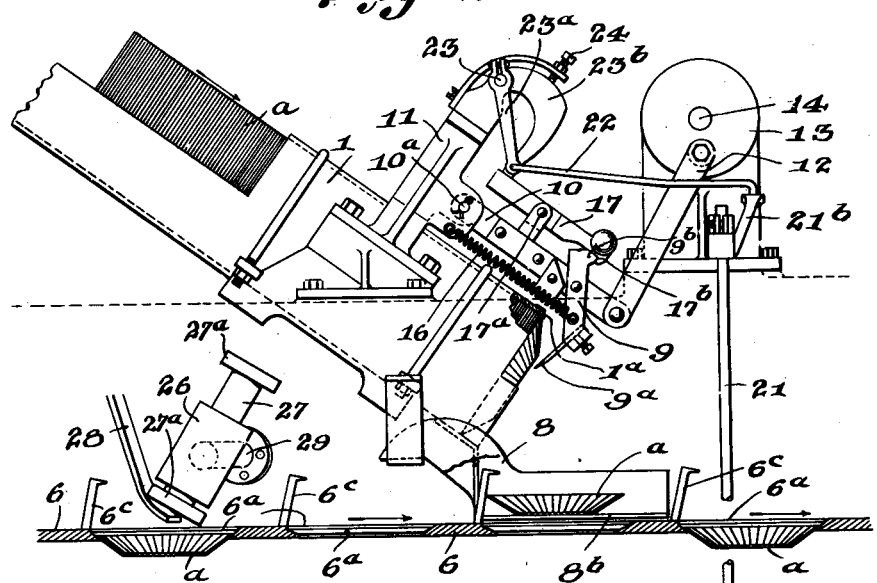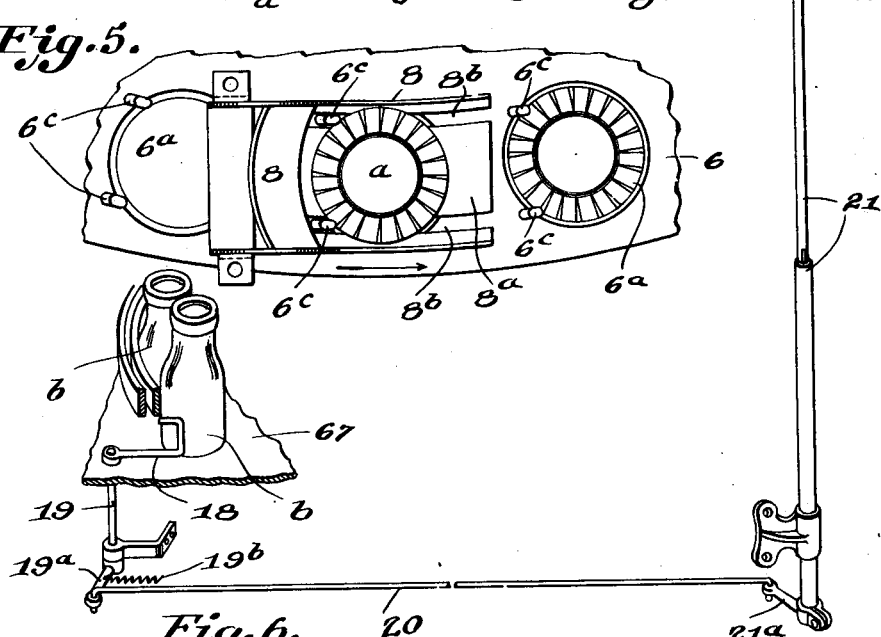

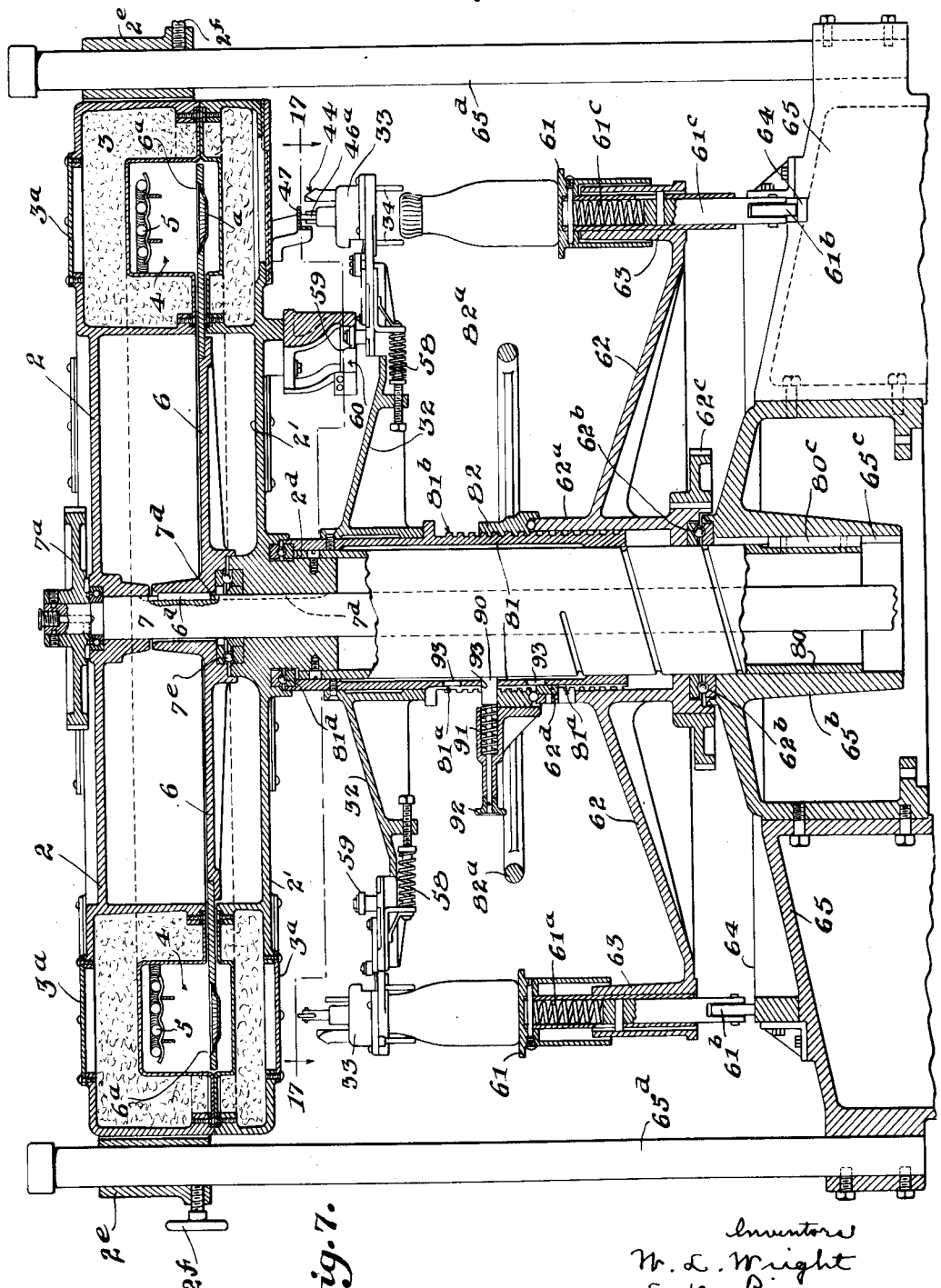

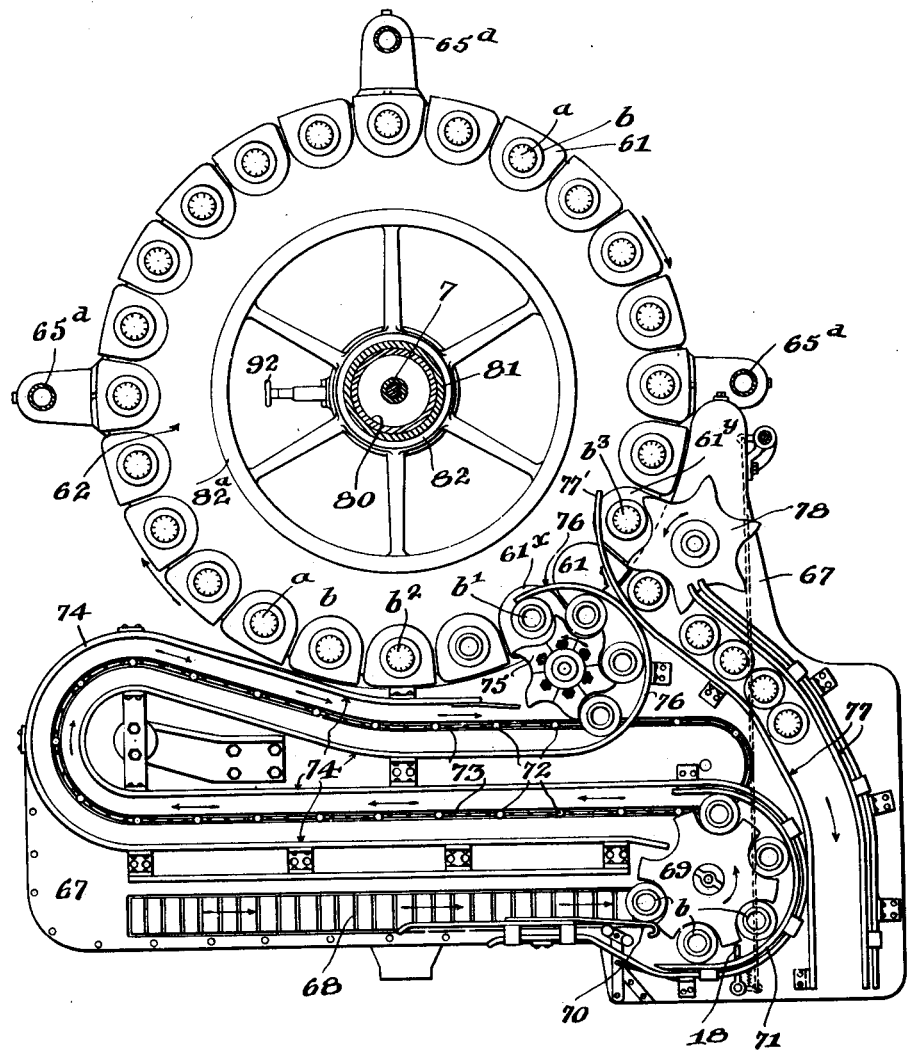

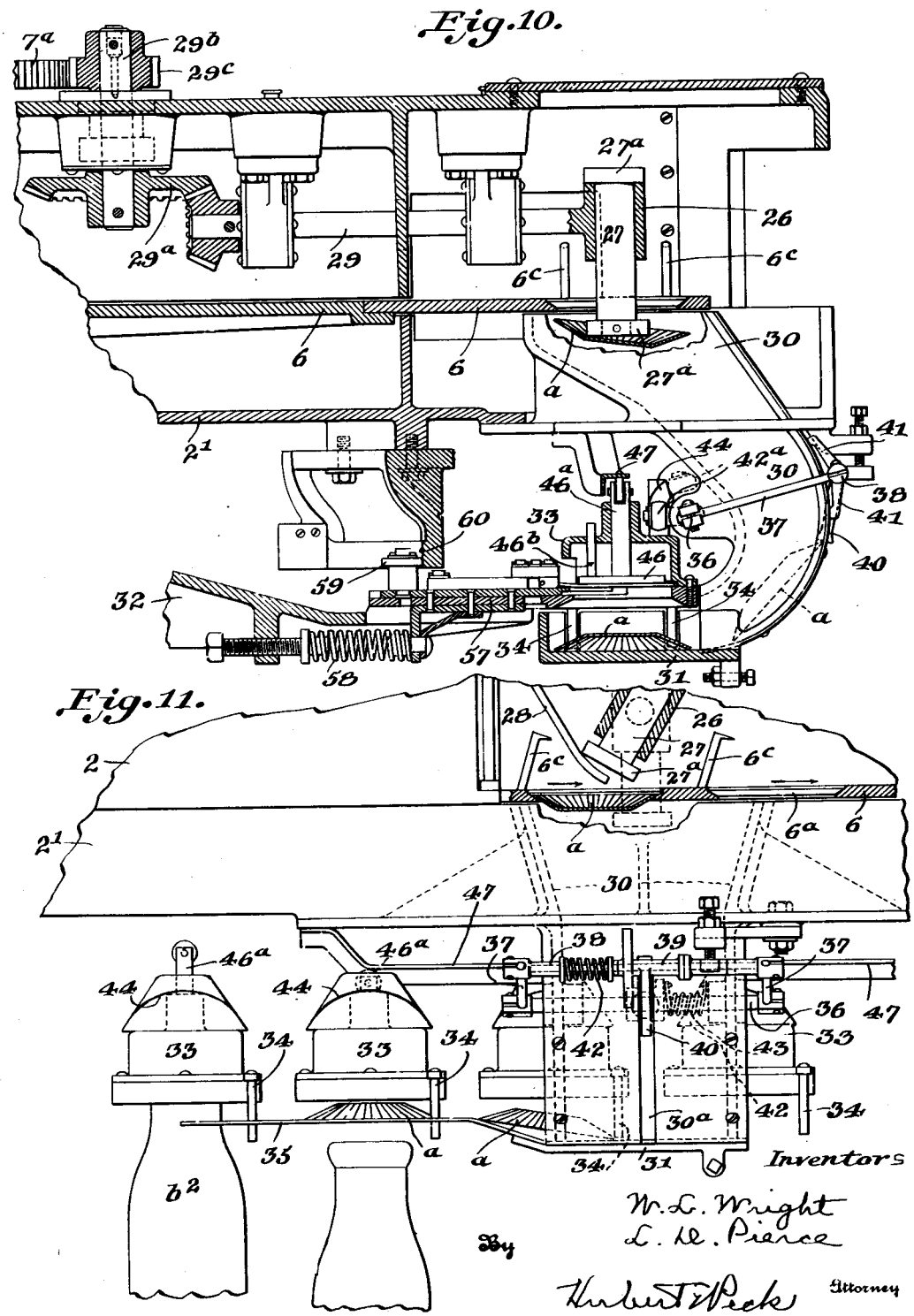

Oct. 25, 1932.  W. L. WRIGHT ET AL  1,884,952
HOOD CAPPING CONTAINER
Filed May 9, 1929   12 Sheets-Sheet 8

Inventors
W. L. Wright
L. D. Pierce

By Hubert F. Peak Attorney

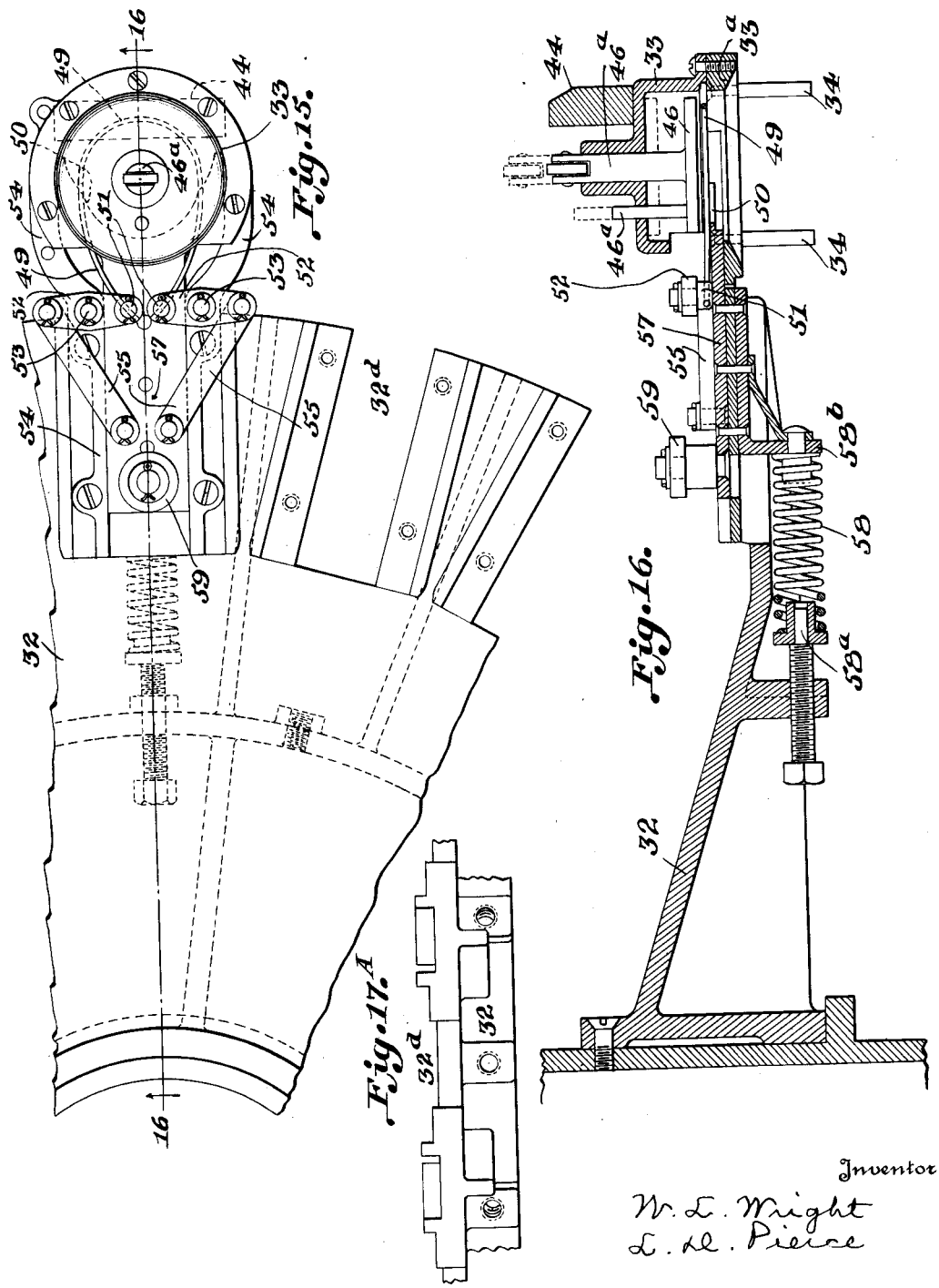

Oct. 25, 1932.  W. L. WRIGHT ET AL  1,884,952
HOOD CAPPING CONTAINER
Filed May 9, 1929  12 Sheets-Sheet 10

Oct. 25, 1932. W. L. WRIGHT ET AL 1,884,952
HOOD CAPPING CONTAINER
Filed May 9, 1929 12 Sheets-Sheet 11

Oct. 25, 1932.  W. L. WRIGHT ET AL  1,884,952
HOOD CAPPING CONTAINER
Filed May 9, 1929   12 Sheets-Sheet 12

Inventors
W. L. Wright
L. D. Pierce
By
Herbert E. Pech, Attorney

Patented Oct. 25, 1932

1,884,952

UNITED STATES PATENT OFFICE

WILBUR L. WRIGHT AND LEE D. PIERCE, OF FULTON, NEW YORK, ASSIGNORS TO OSWEGO FALLS CORPORATION, OF FULTON, NEW YORK, A CORPORATION OF NEW YORK

HOOD CAPPING CONTAINER

Application filed May 9, 1929. Serial No. 361,780.

This invention involves improvements in machinery for hood capping containers; and the objects and nature of the invention will be understood by those skilled in the art in the light of the following explanations of the accompanying drawings that illustrate what we now believe to be the preferred mechanical expressions or embodiments of our invention from among other forms, constructions, combinations and arrangements within the spirit and scope of the invention.

An object of the invention is to improve apparatus for receiving, reducing to a moldable condition, applying to container heads and securing on such heads, paper-like material hood cap disks that carry or embody, at least at the securing parts of the annular skirt portions of said disks, a suitable binder that renders such parts stiff or set at atmospheric temperatures and capable of becoming soft or moldable when heated to approximately binder fusing temperatures and capable of quickly setting or cooling to stiff or hard securing condition on the container heads.

A further object of the invention is to provide improved apparatus for bottles delivered at comparatively high speed in a more or less continuous succession from capping and filling machinery, with the end in view of maintaining a multiplicity of advancing hood cap disks in a moldable condition to provide a supply of such moldable disks for rapid successive delivery to the bottle heads, and the provision of means for gathering and contracting the moldable hood cap skirts under the bottle rims and holding such contracted skirts tightly to the bottles until set to securing condition under said rims.

Another object of the invention is to provide bottle hood capping apparatus of an improved type wherein cold or stiff hood cap disks are successively delivered from a common supply to continuously moving means for advancing a multiplicity of such disks while subject to conditions rendering such disks soft and moldable for the purpose of always, during operation, maintaining an ample supply of disks in a moldable condition, for delivery as required for deposit on bottle heads for ultimate contracting and clamping thereon until set to secured condition.

A further object of the invention is to provide apparatus for hood capping bottles with hood cap disks while in a soft condition and capable of setting on the bottle heads by cooling at atmospheric or room temperatures, wherein the cool hood cap disks are successively delivered for treatment and successive ultimate deposit on bottles continuously arriving in succession at the hood capping station only as advancing bottles are in line to meet the moldable disks, respectively, at the hood capping station, so that if there is a break in or bottle missing from the advancing line of successive bottles, there will be a corresponding break in or moldable hood cap missing from the succession or line of hood caps also correspondingly advancing toward the hood capping station.

Another object of the invention to to provide improvements in means, in bottle hood capping apparatus, for contracting and annularly and radially pressing the moldable hood cap skirts under the bottle rims and thus holding the same until set, to increase the efficiency of the secured hood caps and the holding qualities thereof.

A further object of the invention is to provide various improvements in hood capping machinery, to increase the efficiency, reliability and capacity thereof and improve the product thereof.

With the foregoing and other objects in view, our invention consists in certain novel features, combinations, and arrangements as more fully and particularly set forth and specified hereinafter.

Referring to the accompanying drawings, forming a part hereof:

Fig. 1 shows in elevation apparatus constituting an embodiment of our invention, a stack of stiff or cool paper material hood cap disks being shown at the common supply station, with bottles travelling to and from the hood capping station, and a hood capped bottle discharged by the machine, various bottle guiding walls being broken away.

Fig. 2 is a top plan of the heating chamber and parts carried thereby, the disk supply station and means for feeding disks therefrom not being shown, and the bottle feed ways and conveyers being omitted.

Fig. 3 is a detail side elevation of the heating chamber and parts carried thereby, a side door being open to expose certain parts within the chamber, the upper portions of certain parts below the chamber, also being shown.

Fig. 3a is a detail elevation, partially broken away, showing the initial feeder in various positions.

Fig. 4 is a detail sectional elevation, the heating chamber housing not being shown, the feed mechanism for successively delivering disks from the supply to the disk rotor carrier in the heating chamber being shown in elevation, the disk magazine being partially broken away, a portion of said disk carrier being shown in vertical section, a portion of the means for throwing said feed mechanism into and out of operative disk feeding position being shown, the means for ejecting moldable disks from said rotor for delivery at the bottle capping station being shown.

Fig. 5 is a detail top plan of a portion of disk rotor under said feed mechanism, showing the disk chute, but the magazine and initial disk feeder.

Fig. 6 is a detail more or less diagrammatical perspective view of the bottle detector for controlling the disk feed mechanism, a portion of the bottle path being shown with two advancing bottles therein.

Fig. 7 is a central vertical section, in the plane of the main vertical shaft of the machine, certain parts not being shown.

Fig. 8 is a cross section on line 8—8, Fig. 1.

Fig. 9 is a detail side elevation, somewhat diagramatically illustrating the rotary annular series of bottle stools or carriers and the rotary annular series of complementary heads for receiving the bottle heads, the housing for the heating means being indicated by dotted lines.

Fig. 10 is a detail vertical section on the line 10—10, Fig. 2.

Fig. 11 is a detail side elevation, partially in vertical section, of the portion of the machine shown by Fig. 10, looking at the same from the right hand side of Fig. 10.

Figure 12:
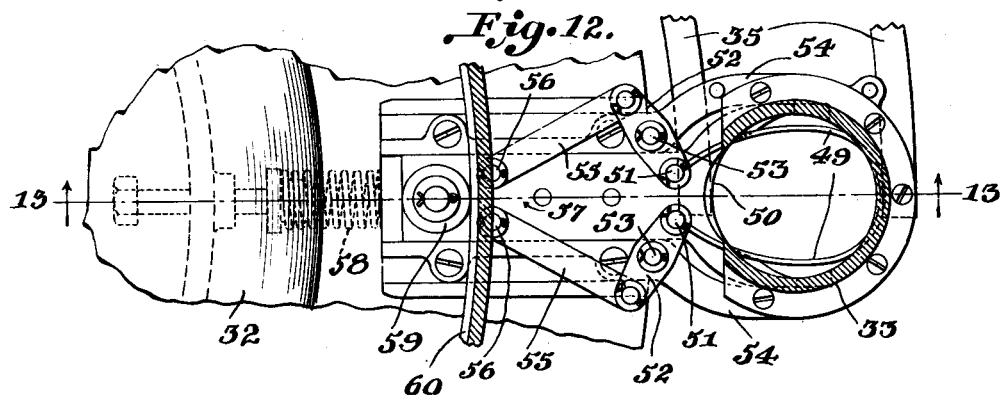
Figure 13:
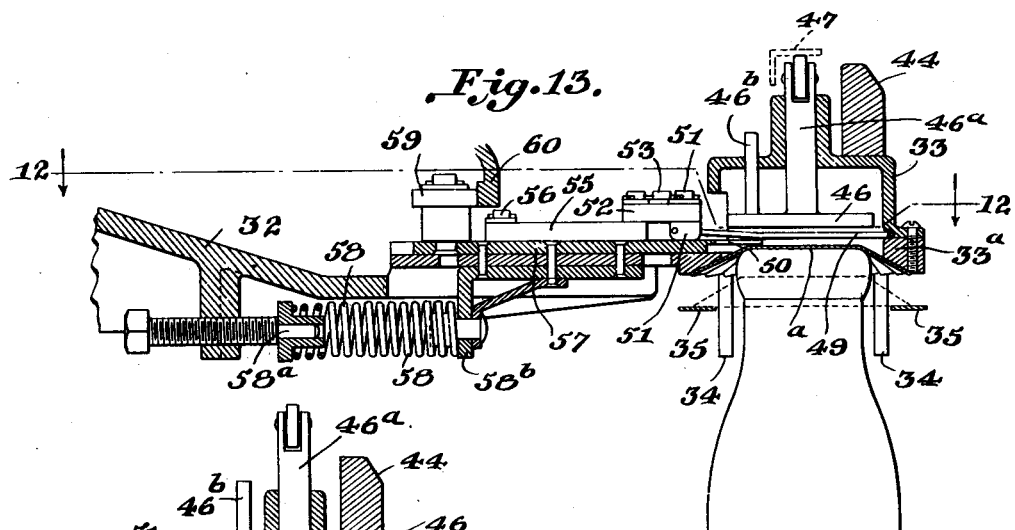

Fig. 12 is a detail horizontal section on the line 12—12, Fig. 13.

Fig. 13 is a detail vertical section on the line 13—13, Fig. 12.

Figure 14:
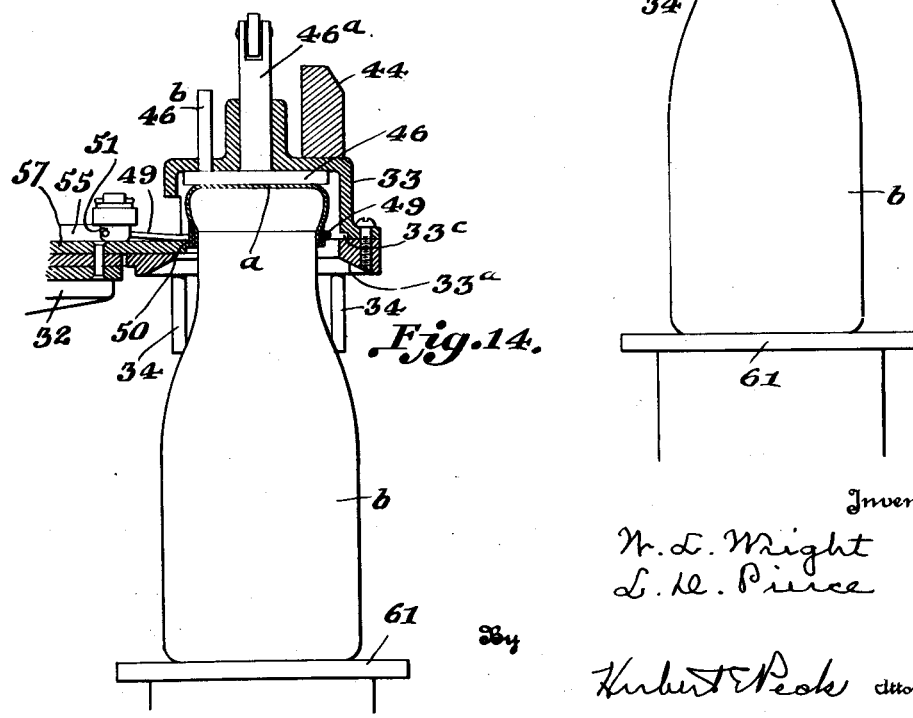

Fig. 14 is a detail vertical section taken in the same plane as Fig. 13 but showing the bottle at its limit of upward movement with respect to the head and clamping means.

Fig. 15 is a detail top plan of a segment of the rotor for the annular series of bottle head receiving members and clamps, the capping heads, one of said heads being shown.

Fig. 16 is a vertical section on the line 16—16, Fig. 15.

Figure 17:
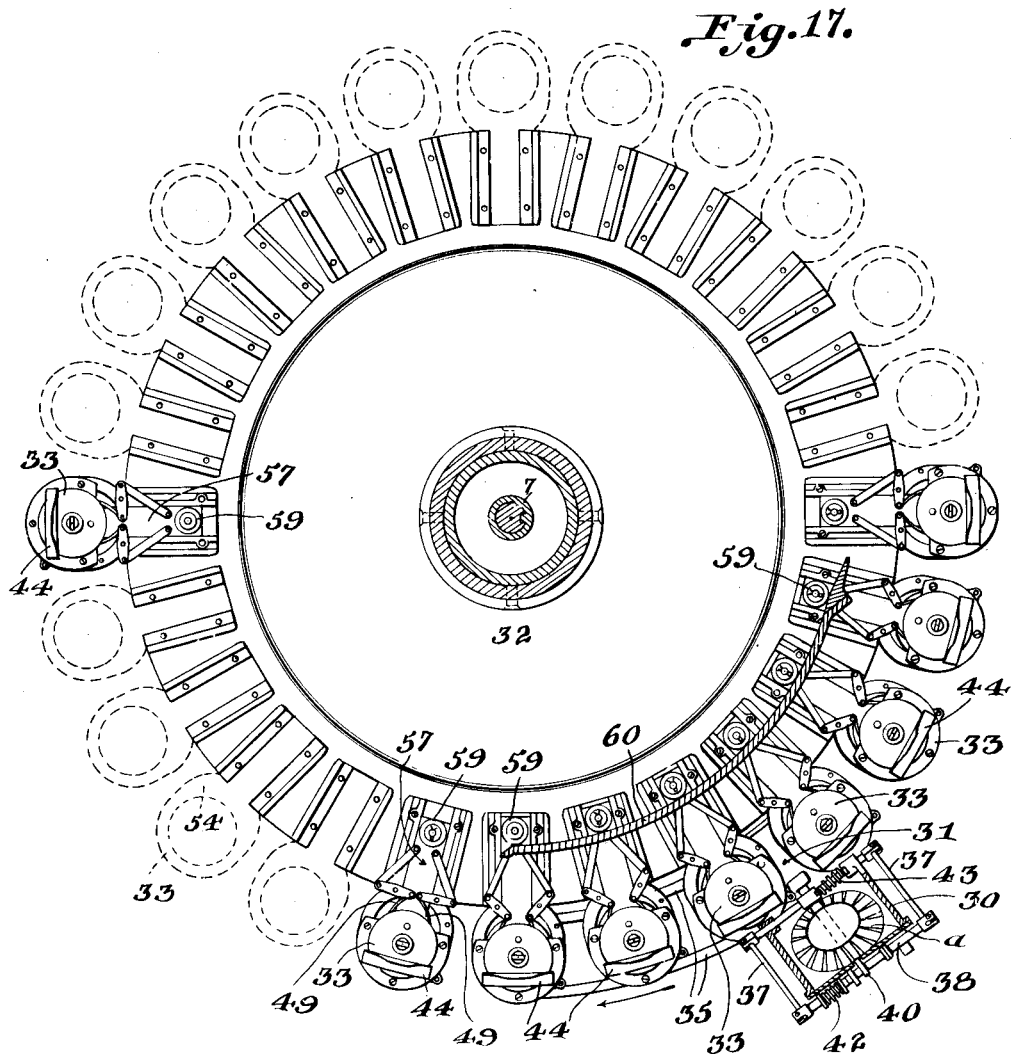

Fig. 17 is a horizontal section on the line 17—17, Fig. 7, certain parts being removed and certain parts indicated by dotted lines.

Fig. 17A is a detail edge view of a portion of the rotor of Fig. 17 with parts removed therefrom.

Figure 18:
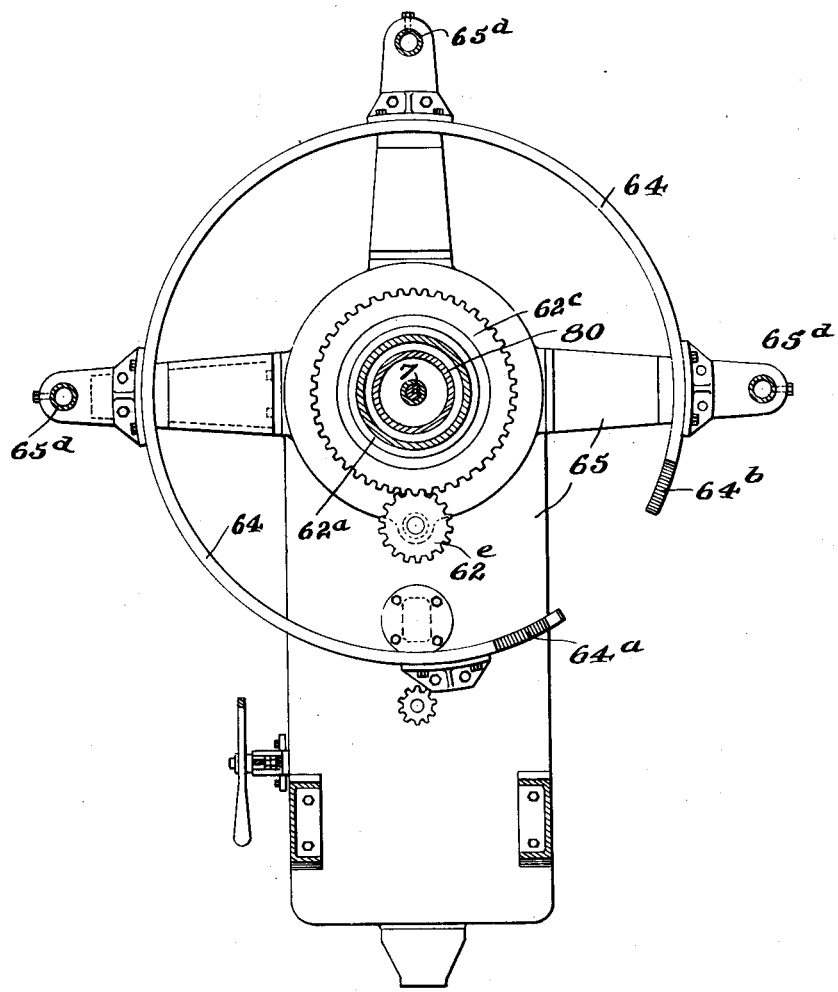

Fig. 18 is a detail horizontal section showing the machine base and the fixed track controlling the vertical positions of the bottle stools of the annular series carried by its rotor, the hub of said rotor being shown in vertical section, the driving gearing therefor being shown in top plan.

Figure 19:
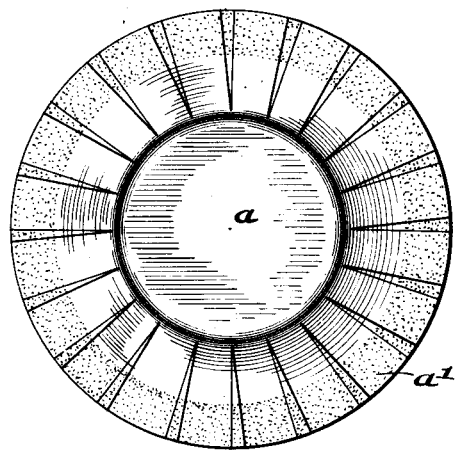

Fig. 19 shows a binder carrying paper material hood cap disk.

Figure 20:
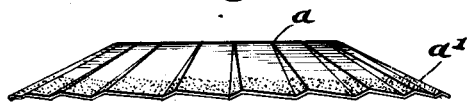

Fig. 20 shows the disk in edge elevation.

Figure 21:
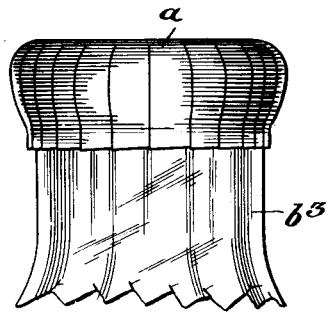

Fig. 21 shows in elevation the head portion of a container hood capped by the machine disclosed hereby.

Figure 22:
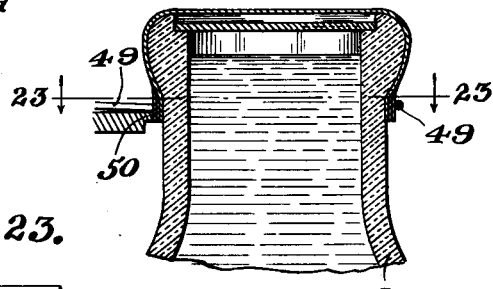

Fig. 22 is a vertical section of a bottle head and hood cap contracted and clamped thereon by the clamping means shown in vertical section.

Figure 23:
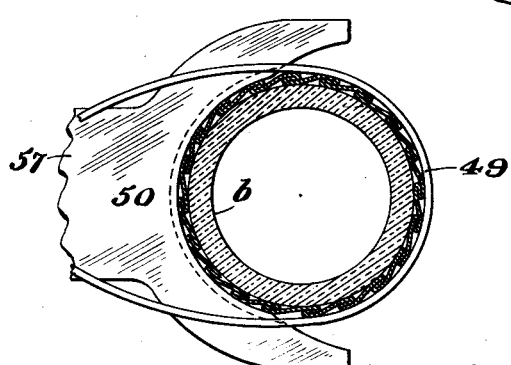

Fig. 23 is a horizontal section on the line 23—23, Fig. 22.

In the particular example illustrated, the machine is supplied with binder carrying hood cap disks, such as $a$, (Figs. 19 and 20), preferably composed of sheet paper in flaring skirt form with at least the annular securing portions $a'$, of the longitudinally fluted or creased skirts carrying the binder that renders such skirts capable of becoming soft or moldable when heated to approximately fuse the binder and capable of quickly setting at atmospheric or room temperatures to stiff or hard securing condition. However, we do not wish to limit our invention to the particular form or binder characteristics of the hood cap disks. The machine preferably receives a supply of disks in cool or set condition, usually with the disks more or less loosely nested together in reversed or upside down position to form a stack, held by and feeding downwardly by gravity in a downwardly inclined disk magazine 1, constituting the common or initial disk supply of the machine. This magazine 1, is in this instance, fixedly secured on the top of the machine, and is open and accessible so that the stack of disks can be observed and replenished as required. However, we do not wish to limit all features of our invention to arrange the disks upside down which necessitates turning over for placing on the bottle heads right side up.

The disks are removed from the magazine discharge and delivered one at a time to the successive individual disk holders or pockets of a horizontally rotating disk carrier, the holders or pockets of which travel in a long heating chamber wherein the disks are reduced to a soft or moldable condition.

The moldable disks are successively discharged from said carrier for delivery at a bottle capping station where the successive moldable disks and the successive bottles to be hood capped, are brought together for the final hood capping operation, all as described hereinafter. The machine embodies a horizontally disposed hollow housing or box 2, 2', having a top wall on which the magazine 1, is mounted and above which it is exposed and accessible. In the particular example illustrated, this housing 2, is approximately cylindrical in form, although the invention is not so limited, and is internally formed and arranged to provide an approximately annular or ring shaped insulating space or chamber 3, the surrounding closed wall of which is formed by the peripheral wall of the housing, and the top and bottom walls of which are formed by the top and bottom walls of the housing, and the inner circular wall of which is formed by vertical partitions within the housing. The said top and bottom walls are formed with normally closed hand-holes 3a, through which access can be had to the insulation packing preferably filling chamber 3.

Concentrically within the insulating chamber 3, and spaced from the adjacent walls thereof, is preferably arranged a relatively small annular heating chamber 4, the walls of which are preferably composed, in whole or in part, of material that is a poor conductor of heat. and preferably in the top portion of this inner annular chamber 4, are supported, any suitable system or arrangement of electric resistance wire heating coils or other suitable electrical heating units 5, to maintain the desired binder fusing or hood cap softening temperatures within the chamber 4. Any suitable connections are provided for connecting the heating units into a power circuit, and any suitable electrical instruments are provided for indicating and controlling the temperatures within said heating chamber. The horizontal rotary disk carrier or rotor 6, intersects the housing 2, 2', and the chamber 4, and rotates on a vertical axis alined with the vertical axis of said chamber 4. and the rim portion of said carrier travelling within said chamber is formed with an annular series of similar uniformly spaced hood cap disk pockets or holders 6a, each opening vertically completely through the carrier, the minimum interior diameter of each such opening being but slightly less than the extreme diameter of the hood cap disk. Each disk pocket is adapted to receive one hood cap disk and uphold the same in a horizontal, in this example, upside down position, i. e., with its flaring skirt portion at the upper side thereof and thus exposed to the heat radiation from the heating coils as well as the highly heated air within and hot walls of the chamber (Fig. 7). The rotating carrier, is arranged to constantly carry a large number of the disks simultaneously exposed to the high temperature in the heating chamber and to constantly advance each disk from one end of the chamber to the other. In the example shown, the rotor 6, is composed of a circular horizontal plate or disk, constantly driven by and keyed to a central vertical rotary drive shaft 7, at its upper portion mounted to rotate in and extending upwardly through the top wall of housing 2, and above said wall provided with and driving gear 7a.

To admit the rim portion of rotor 6, to the interior of the annular heating chamber, the housing 2, and said chamber are, in this example, composed of two non-rotary horizontal sections, namely an upper section 2, and a lower mating section 2', between which the rotor 6, rotates and is snugly arranged.

To permit delivery of the hood cap disks from magazine or supply 1, to the holders 6a, of the rotor 6, a break is provided in the annular housing 2, and top insulating wall of heating chamber 4, to provide an intermediate chamber opening upwardly through the top wall of housing 2, and closed at the bottom by the rim portion of rotor 6 (Figs. 2, 3, and 4), and closed off from the ends of the annular chambers 3, 4, by radial partitions. The lower end of the fixed inclined magazine 1, extends down through the top opening in housing 2, with the open bottom or discharge mouth of the magazine directly over the path in which the pockets or holders 6a, travel. The stack of nested hood cap disks a, is retained or upheld in the magazine by suitable stop means, such as depending lip 1a, projecting from above into the discharge mouth (Fig. 4). The magazine is provided with a fixed chute 8, arranged below the discharge mouth and embodying a flat floor 8a, arranged closely over the rim portion of carrier 6, having a rear free discharge edge and longitudinally slotted at 8b, for the passage of pusher fingers 6c, fixed to and upstanding from carrier 6, behind the pockets 6a, respectively, to push each cap deposited on floor 8a, forwardly thereon to drop therefrom convexed side down into the pocket 6a to which said particular set of pusher fingers belong (Figs. 4, 5).

The hood cap disks of the stack in the magazine, are successively removed and stripped past the stop finger 1a, in such manner as to tilt and drop flaring skirt up, onto the floor 8a, for removal by the pushers 6c, as before described. Various means can be provided for feeding the disks a, successively to the pockets of the rotating carrier. As an example, we show a vertically swingable or reciprocating upright finger 9, at its free end provided with pricker points 9a, in front of the bottom disk a, in the magazine, and inclined downwardly toward said disk and arranged to engage and take hold of the top convexed portion of said disk, on the downward operative stroke of the finger, and depress and strip the upper edge of the disk from the stop 1a, and thus free the disk to tilt forwardly and downwardly from the magazine and drop to horizontal position on floor 8a, guided by the chute.

In the particular example illustrated, the finger 9, depends from and is pivoted to a vertically swingable lever 10, fulcrumed at 10a, to fixed bracket 11, and oscillated vertically by pitman 12, pivotally joined to lever 10, and to a crank pin of crank disk 13, constantly rotated by shaft 14, mounted in bearings on housing 2, and driven by gearing 15, from central vertical rotary shaft 7, through its top gear 7a.

A spring 16, constantly exerts its tension to swing finger 9, to carry the prickers 9a, into operative engagement with the bottom hood cap disk in the magazine discharge, while the inclination of said prickers permits them to move upwardly without taking hold of or disturbing said disk.

The finger 9, is normally held, by a suitable detent mechanism, from operative feeding position with relation to the bottom hood cap disk in the magazine 1, so that said finger will swing up and down without feeding a disk, unless the detent mechanism is actuated by a bottle detector, to release the finger 9, to cause delivery of a disk to the heating means for ultimate delivery in a soft condition to the bottle that caused actuation of the detent mechanism through the medium of the bottle detector. For instance, we show a horizontally disposed lever 17, fulcrumed intermediate its length on transverse pivot 17a, carried by lever 10, at its outer end having notch 17b, to receive tooth 9b, at the upper free end of lever 9, and thereby hold lever 9, against the tension of spring 16, in inoperative position (Fig. 4).

At a suitable point in the path of the bottles b, to be hood capped, on their travel to the hood capping station, a rocking detector arm or finger 18, (Fig. 6) is arranged and spring pressed by spring 19b, to project into the bottle path to be swung to one side by engagement with and the forward travel of a bottle b, and to immediately swing back into said path as the bottle slips by the finger. This detector finger is carried by vertical rock shaft 19, having crank arm 19a, pivotally connected by push and pull link 20, to crank arm 21a, of vertical rock shaft 21, at its upper end having crank arm 21b, above housing 2, pivotally connected by push and pull link 22 to crank arm 23a, of horizontal rock shaft 23, mounted in bracket 11, on top of the housing 2. This rock shaft 23, has depending crank arm 23b, limited in its upward movement by stop 24, and having its free end above and arranged to abut the inner free end of detent lever 17, to depress the same to free the tooth 9b, of disk feeding finger 9, from holding notch 17b, of detent lever 17, (Figs. 4, 6). In other words, the lever 10, carrying finger 9, and detent lever 17, will oscillate up and down, with respect to depressing arm 23b, the finger 9, being held from operative position, as in Fig. 4, so long as no bottle swings the detector finger 18 (Fig. 6) outwardly from the bottle path in which the finger is yieldingly held by spring means, i. e. so long as no bottle is advanced past the detector finger toward the hood capping station. However, a bottle b, passing the detector finger on its way to the bottle capping station, swings said finger to one side and thereby, through the said rocks shafts, crank and link connections, swings rock shaft 23, to depress arm 23b, and rock detent lever 17, to release finger 9, for an operative hood cap disk feeding or discharging stroke. The disk for said bottle is thereupon discharged to the heating means and started on its way to meet the particular bottle at the hood capping station. When the particular bottle passes, the detector finger 18, slips past the bottle to normal position in the bottle path and the locking or holding relation between finger 9, and detent lever 10, is automatically re-established. The feeding finger 9, is thus released by each advancing bottle, to feed a hood cap disk therefor, and after such feeding stroke returns to inoperative position as in Fig. 4.

As shown by dotted lines Fig. 3a, when the feeder is released by elevation of the weighted free end of detent 17, through action of arm 23b, the pricker 9a, on its downward movement, takes hold of the top edge portion of the bottom disk a, and forces said edge portion down free of the retaining lip 1a, to free the disk. The upper portion of this disk as forced downwardly by the pivoted feeder or finger 9, rides downwardly and outwardly on the flared disk immediately behind the same and correspondingly swings the lower end of the finger outwardly to the full line position Fig. 3a at approximately the limit of downward movement of the feeder. The upper end 9b, of the feeder 9, is thus brought to position to enter the holding notch of detent 17, which is thereupon released by arm 23b, to drop to normal position locking the feeder in inoperative position (Fig. 4).

In the example illustrated there happen to be some twenty-four disk pockets 6a, in the rim of the rotary disk or carrier 6, although our invention is not so limited and all of these pockets, except those passing through the intermediate chamber that receives the disk magazine, are travelling in the primary heating chamber 4, with the disks a, carried thereby exposed to and softened by the full temperature thereof. In the particular example shown, the flaring hood cap disks a, are exposed concaved side up in the main heating chamber or oven, to the radiation from the heating elements, and hence said disks seem to more quickly and efficiently retain and absorb the heat to fuse or approximately fuse the binder and render the caps, or at least the binder carrying skirt portions thereof, soft and moldable.

At this point, we also call attention to the desirability of employing paper in the manufacture of the hood cap disks, that will stand without deterioration, the high temperatures to which the caps are often subjected in the ovens, and hence we may employ for this purpose specifically prepared paper that will stand temperatures as high as approximately 700° F. although our instant invention is not so limited.

The pockets 6a, are successively loaded with disks, one disk to a pocket, while passing through said intermediate chamber and these disks are subjected to the high temperature of the heating chamber throughout the length thereof, approximately throughout a complete circular path, before reaching the discharge point leading to the hood capping station. At this discharge point or station, located on pocket in advance of the hood cap disk receiving station, see Fig. 4, we provide means for automatically discharging the soft or moldable caps, one at a time, as their pockets successively arrive at said discharge. For instance, in the example shown, we provide, a rotating device for ejecting or punching each soft moldable cap downwardly through its pocket as it passes under said device at said discharge point, so that the released soft cap then drops by gravity from the rotating disk 6, into means for delivering the cap right side up at the hood capping station.

The particular disk discharging punch or ejector embodies a sleeve or hub 26, open at both ends and rotating in a vertical plane on an axis perpendicular to the bore of the hub, an axis that is radially arranged with respect to rotating disk 6. This rotating hub is located above the path in which pockets 6a travel, and carries a heavy double end plunger or ejector consisting of a straight shank 27, of greater length than hub 26, and freely slidable longitudinally therein by gravity and having heavy or weighted end heads 27a. The hub 26, is continuously rotated in timed relation to the continuous rotation of disk 6, and as the hub reaches a vertical position the ejector will drop therethrough and its bottom head 27a, will strike the soft disk a, in the advancing pocket 6a, under the hub, and by reason of the weight of the ejector, will push the disk a, down through the bottom and clear of the disk 6. A fixed track 28, is provided to uphold the ejector until it reaches approximate vertical position centered over the disk a, whereupon the ejector slips past the track and drops onto the depressed center of disk a, with sufficient force to eject the same. The hub 26, continues its rotation with disk 6, and lifts the ejector from the pocket without interference with disk 6, and reverses the ejector so that its opposite end head 27a, will eject the cap a, from the next pocket (see Figs. 2, 3, 4, 10, 11).

In the example shown, the hub 26, and the ejector are arranged in said intermediate chamber under the magazine 1, and the hub is fixed to and transversely of the radial rotary shaft 29, suitably mounted in housing 2, and driven from center vertical shaft 7, by gearing 29a, countershaft 29b, and gearing 29c, 7a, (Fig. 10). The moldable disks a, discharged from the pockets 6a, drop into the open upper end of an upright tubular chute 30, that curves downwardly and inwardly to a lateral discharge opening onto horizontal disk receiving floor 31. The chute 30, is formed and arranged to cause the disks to turn over as they descend therethrough and deliver the disks onto floor 31, convex side up.

In the drawings, we show the vertical outside wall of the top oven or oven housing 2, formed with an opening (Figs. 1, 2, 3) through which cap movement, the discharge chute from the cap supply to rotor 6, and the ejector for discharging hot moldable caps from rotor 6, are accessible and visible, and this opening is normally closed by swingable door 2g.

Below the housing 2, 2', a horizontal rotor or hood capping head carrier, in the form of disk 32, is mounted to rotate on a vertical axis coincident with the longitudinal axis of vertical shaft 7, and at its rim portion, this rotor 32, is equipped with an annular series of similar uniformly spaced hollow heads 33, and cooperating hood cap contracting and clamping devices, in number, preferably, equal to the number of pockets 6a, in hood cap rotor 6, with the heads 33, preferably, vertically alined with pockets 6a, respectively. These heads 33, are rigid with the rotor 32, and are arranged radially beyond the periphery thereof and consequently the annular series of heads constitutes the rim of the disk 32, and such rim, as the disk revolves, moves above the floor 31, onto which the moldable hood caps a, are transversely delivered from depending chute 30. The heads 33, making up said rim, are spaced upwardly from said floor, and successively move longitudinally of and above said floor, and pusher pins 34, fixed to and depending from the rear portions of heads 33, in the direction of movement thereof, sweep longitudinally of the floor and push the hood caps a, successively therefrom, while located centrally under and vertically alined with the head 33, from which the pins 34, pushing the cap depend, onto a pair of spaced free end parallel tracks 35, extending in longitudinal continuation of floor 31, (Figs. 11-14). The cap supporting tracks 35, are spaced apart a distance sufficient to permit the pushers 34, to travel between them and also to permit the bottle heads to move up between and clearing the tracks, and consequently the diametrically opposite edge portions only of the hood caps a, rest on the top surfaces of the tracks while the caps horizontally span the distances between the tracks with their concave sides down and the caps in hood capping position to centrally receive and operatively seat on the bottle heads that move up into the caps while thus supported and carry them up into the hood capping heads 33, as hereinafter described. This is the hood capping station (Fig. 11) where the bottles and moldable hood caps are brought together and entered into the hood capping heads to initiate the hood capping operation. Suitable mechanism is provided to assure the delivery of a moldable hood cap a, for each head 33, onto the floor 31, into the path and in advance of the pushers 34, of said head, so as to slide along the floor 31, and the tracks 35, with and properly positioned under said head. The hood caps a, successively drop by gravity into and are turned over while falling through the chute 30, but may not slide completely through the chute to proper position on floor 31, hence said suitable mechanism is provided which, in this instance, embodies a rock shaft 36, arranged inwardly beyond the chute 30, and mounted in parts rigid with the walls thereof and having fixed thereto, outwardly extending radial arms 37, beyond the opposite side walls of the chute 30, and at their outer ends carrying a horizontal cross shaft 38, beyond the outer wall of the chute. A sleeve 39, is rotatively mounted on shaft 38, and provided with a radial depending hood cap pusher finger 40, projecting through longitudinal slot 30a, into the path of the hood caps in chute 30, to push the same one at a time to operative position onto floor 31 (Figs. 10, 11, 17). While we do not wish to so limit our invention, the pusher 40, can be more or less retracted from the interior of the chute when said pusher is approximately at its limit of upward movement. For instance, in the example shown, the exterior surface of the chute curves downwardly with varying radii, and the double crank arm 41, is rigid with sleeve 39, that rocks on shaft 38, and the arms of said crank 41, ride vertically on said variously curved outer wall of the chute and extend upwardly and downwardly, respectively, from said sleeve, and hence said arms in following the chute curvature upwardly rock sleeve 39 to retract the pusher 40, and in following the chute wall downwardly, rock sleeve 39 to project the pusher 40 into the chute to advance the hood cap disks, as hereinbefore described. Sleeve 39, is loose on shaft 38, and is yieldingly pressed longitudinally to frictionally hold one end thereof against the adjacent end of the hub of one arm 37, by coiled expansion spring 42, on shaft 38, and compressed between the hub of the other arm 37, and the adjacent end of sleeve 39. The rock shaft 36, is provided with a radial arm 42a, fixed thereto and preferably having an anti-friction roll mounted thereon. A coiled spring 43 is secured to the shaft and an adjacent fixed part of chute 30, to yieldingly rotate the shaft to depress arm 42a, and said arm 42a, is periodically elevated against the tension of spring 43, to actuate the cross shaft 38, and the pusher 40, on a downward operative stroke and permit the return stroke thereof by spring 43, through the medium of segmental cam tracks 44, carried by and exposed at the tops of the hood capping heads 33.

The arm 42a, is yieldingly depressed by its spring 43, and is located in the path traveled by the cam tracks 44, of the heads 33, and is successively engaged and elevated by each head as it approaches the hood cap receiving station over floor 31, to operate pusher 40, to properly locate a hood cap for operative pushing engagement by pins 34, of said head, and thereupon the cam track of the head permits the arm 42a, to drop to normal position and the pusher to return to its normal elevated position (Fig. 10).

In the example shown, each capping head 33, embodies a cup-like or hollow housing, in reversed position, fixed to and arranged radially beyond periphery of the rotary carrier 32. This housing is open at the bottom to provide a bottom mouth of a diameter to more or less snugly receive the bottle head with the hood cap thereon. The housing provides a downwardly flaring mouth formed by fixed mouth ring 33a, having an upwardly contracting beveled or downwardly flaring bottom surface (Figs. 13, 14), so formed and arranged as to contract the hot moldable downwardly flaring skirt of the hood cap disk a, resting centrally on the bottle head, as picked up by said head from tracks 35, (Fig. 13) on the upward movement of the bottle head between said tracks, as the bottle head with the flaring skirt disk moves up through said mouth ring into the head. The skirt of the hood cap disk is thereby forced down and contracted to approximately vertical cylindrical form around the bottle head, and in this form is carried into and approximately half way through suitable skirt annular compressing and holding or clamping means then in completely opened or expanded condition.

As the bottle head with the hood cap disk thereon, rises in the capping head, the center of the disk meets the flat bottom face of an ejecting plunger 46, then in its lowermost position, movable vertically in the capping head, and the disk center is hence clamped between the mouth rim of the bottle and the plunger, as the bottle head rises in the capping head lifting the plunger to its limit of upward movement (Fig. 14).

The plunger 46, slidable vertically in the capping head, embodies an upstanding shank 46a, slidably extending through the top wall of the capping head, and at its upper end usually equipped with an anti-friction roller, to travel along the bottom surface of a fixed overhanging plunger depressing track 47, beginning in the direction of travel of the capping heads 33, at the hood capped bottle discharging station (Fig. 1) and ending approximately at the hood capping station where each bottle meets its moldable hood cap disk (Fig. 11). In other words, as each bottle head is on its upward movement carrying the hood cap disk upward into the capping head 33, corresponding to such bottle, the roll on the shank of the ejecting plunger of said capping head, passes free from the straight depressed portion of track 47, and the plunger is free to move up its full stroke with the bottle head in the capping head (Figs. 11, 13, 14). Each ejecting plunger 46, is usually provided with an upstanding guide pin 46b, slidable through the top wall of head 33, to prevent rotary movement of the plunger on its shank as an axis.

Each hood capping head includes hood cap skirt contracting and compressing or clamping mechanism associated and cooperating with its head, to completely encircle the depending approximately cylindrical skirt on the bottle head, while still moldable, and radially and annularly contract said skirt under the annular rim enlargement of the bottle head, completely around the circle of the skirt to tightly compress and close together and against the bottle neck each and every longitudinal fold or crease in the skirt by which the surplus skirt material is taken up, and thus hold the same for a substantial length of time until set to stiff cool hood cap securing condition.

In the particular example shown, each clamping mechanism is radially or annularly expansible and contractile, and embodies a flexible looped garrotting band or wire 49, and cooperating concaved or segmental compressing jaw 50, to complete the circle or annulus of the garroting clamp or compressor.

The flexible spring band or wire 49, is in the form of a horizontal loop adapted to the internal groove or seat 33c, within the capping head 33, above the mouth ring 33a, and encircling the interior of the head except for a radial opening through the vertical side wall of the housing toward the center of rotary carrier disk 32. The opposite spaced ends of garroting loop 49, extend outwardly through said radial opening and are secured to short vertical shafts 51, respectively, rotatably mounted in the free ends of oppositely and transversely-arranged horizontally swingable toggle levers 52, respectively, arranged exteriorly of head 33, and mounted on vertical studs 53, respectively, located midway the lengths of the levers and carried by member 54, supporting head 33, and fixed to and projecting radially from disk 32.

The two levers 52, are simultaneously swung to carry their adjoining free ends outwardly toward the head 33, to expand or open the loop 49, and to simultaneously carry their said ends in the opposite direction, i. e. in a direction away from head 33, to contract the loop 49, by horizontal links or levers 55, at their outer ends pivotally joined to the ends of levers 52, respectively, opposite the short shafts 51, to which the loop ends are secured. The adjacent inner ends of the two levers 55, are pivotally joined by vertical studs or pivots 56, to the inner end portion of a horizontal elongated slide 57, arranged radially of head 33, and extending therefrom radially along rotor disk 32, and confined to reciprocation radially of said head and disk in a suitable slideway provided by head supporting frame 54, which is secured to disk 32, in a suitable socket 32d, therefor provided in said disk (Figs. 15, 17, 17A).

The outer end of slide 57, is blade-like or relatively thin vertically and is concaved or segmental in formation to form the hood cap skirt clamping or compressing jaw 50, that in curvature approximately conforms to the radius of the bottle neck against which the cap skirt is to be compressed.

Outward sliding movement of slide 57, carries the concaved jaw 50, radially into the head 33, and through the medium of links 55, swings the levers 52, to carry the loop attached inner ends 51, of said levers inwardly in a direction away from head 33, to carry the ends of loop 49 toward each other and to pull the loop as a whole inwardly of the head 33 toward the center of disk 32, while the slide and jaw 50, move in the opposite direction, thereby contracting the garroting ring clamp as an entirety to operative compressing holding position (Figs. 14, 15, 16). Sliding movement of slide 57, in the opposite direction, i. e. toward the center of disk 32, moves the parts of the garroting ring clamp 49, 50, to expanded or opened position (Figs 12, 13) with loop 49, expanded into groove 33c, and the jaw 50, withdrawn from the interior of head 33, so that the bottle head is free to carry the hood cap thereon up through said expanded ring clamp to the position shown by Fig. 14, with the expanded ring surrounding the lower securing portion of the hot moldable skirt of the hood cap on the bottle head.

In the example shown, the ring clamp 49, 50, is spring pressed to normally remain in contracted clamping position and is under constant spring tension to return to such contracted clamping position, and for this purpose expansion spring 58, is compressed between adjustable spring abutment 58a, carried by disk 32, and the opposing spring abutment 58b, formed by a lug rigid with and depending from slide 57. As thus arranged the spring 58, is constantly under tension to force slide 57, outwardly and yieldingly maintain the ring clamp in contracted position.

To move the slide 57, inwardly toward the center of disk 32, to expand the ring clamp to receive bottle heads having moldable caps and to release completely hood capped bottles that have been carried with their hood caps compressed throughout almost the full circular path and have cooled and set, the inner end of the slide 57, is provided with an upstanding stud on which is mounted anti-friction roll 59, to cooperate with a fixed segmental section of track 60, secured to and carried by the frame, in this instance, by the bottom wall of the lower section of housing 2, (Figs. 10, 17). This track, in the direction of rotation of disk 32, begins at a suitable point in advance of the hood capped bottle discharge station and continues to and past that station to and slightly beyond the hood capping station, and the track is so arranged that the roll 59, will engage and ride on the front end of the track and will thereby be pressed back to expand the ring clamp for release of the hood capped bottle from the clamp for downward withdrawal from head 33, at the bottle discharge station, and will thus hold the roll back as it travels along the track to keep the clamp expanded until after the fresh bottle received by head 33, with a hood cap disk loosely thereon, has approximately reached its limit of upward movement in the head with the skirt of the disk pressed down to vertical cylindrical form and pushed up through the expanded ring clamp until the clamp surrounds the bottom or securing portion of the skirt, say the left hand bottle Fig. 11. Thereupon the roll 59, starts to run off the inclined rear end of track 60, and permits the roll to move outwardly under the power of spring 58, to completely contract the ring yieldingly under the power of the spring, and thereby uniformly gather and contract the still hot moldable skirt completely around the full circle thereof and tightly press the same against the rounding cam-like downwardly contracting shoulder of the bottle at the under side of the bottle head rim enlargement. This results in a downward pull on the cap skirt to tighten the top thereof on and across the top rim of the bottle mouth, as well as a contracting tightening of the skirt under and to conform to the contraction of the bottle under its annular rim shoulder. The binder in the longitudinally creased or folded cap skirt is fused or softened by heat when applied to the bottle head and the purpose of the peculiar narrow ring clamp is to gather and lay the folds resulting from these creases and the contraction of the skirt, all in the same direction and uniformly around the circle of the skirt and while still soft to tightly flatten the folds and press their opposite walls together at least along a narrow annular line around the circle of the skirt, and to thus hold the skirt until the bottle has travelled with disk 32, almost throughout the full circle of the bottle path, or until the skirt has cooled and thoroughly set to the desired hard or stiff securing condition. We find that secured hood caps of this binder carrying type have greatly enhanced holding power against the tendency to expand and loosen when subject to excessive moisture, where all of the skirt folds completely around the circle of the skirt are thus held tightly compressed annularly and radially and held in such condition over an extended path until thoroughly set.

The garroting loop 49, while of spring material, is sufficiently flexible to conform to variations in shape and radius, and to draw and contract around the skirt and compress the same under the heavy force of spring 58, while the jaw 50, is forced outwardly against the skirt to span the gap between the loop ends where tangential to the circle of the skirt, all with a yielding spring pressure.

The foregoing describes in detail, one capping head 33, and its associated ring clamp, and these heads and their clamps are duplicated in an endless series around the rim of the rotor 32, so that in the particular example shown twenty-four such heads are employed, which number can be increased or decreased. Also, in this particular example, the track 60, is so arranged, that as rotor 32, constantly revolves, there will always be approximately six capping heads 33, wherein the ring clamps will be temporarily held in expanded position while the clamps of the remaining heads will be in contracted positions holding tightly compressed the skirts of the hood caps in securing position on the bottle heads.

In this example where a constantly moving or advancing rotor provides an annular series of twenty-four capping heads, we provide a correspondingly constantly advancing rotor for a similar number of corresponding bottle carriers or bottle supporting stools 61. We provide an annular series of similar bottle stools 61, arranged in a circle of the same radius as the circle of capping heads 33, with the circle of stools rotating in a horizontal plane below the horizontal plane of the circle of said heads, the axes of rotation of the circles of heads and stools being alined, the stools being vertically alined with said heads, respectively.

The stools are carried by and arranged around the rim portion of the horizontal rotor or rotary carrier disk 62, that rotates around vertical shaft 7, as a center.

At its rim portion, the rotor or disk 62, is formed with an annular series of upstanding hubs 63, the longitudinal vertical bores of which open at their opposite ends above and below the disk. Each stool 61, is centered and vertically movable on a hub 63, and extends above the same, and embodies a shank 61a, depending longitudinally and slidably through the bore of its hub, and at its lower end is equipped with an anti-friction roll 61b, to travel on track 64, fixed on the machine base 65. This track determines the elevation of the stools 61.

The stem 61a, of each stool embodies longitudinally slidable telescoping longitudinal sections, a suitable stop limiting the inward and outward longitudinal telescoping movement of the sections, and a compression spring 61c, yieldingly holding the sections at their limits of outward telescoping movement. This is broadly common construction in bottle stools of this general type to compensate for variations in the overall lengths of bottles of approximate like capacity and to force the bottles into the capping heads under yielding pressure. The bottle elevating and upholding track 64, is circular except for a comparatively short break, and is of uniform high level to uphold all of the bottle stools and bottles thereon at their limits of upward movement, except for a short break that in this particular example includes some four stools where the track permits stools travelling along said break to drop to their limits of downward movement for bottle reception and hood capped bottle discharge (Figs. 9, 18). The receiving end 64a, of the track at this break is beveled or inclined upwardly to the main track elevation, to gradually elevate the uncapped bottle b', just received by a depressed stool at the bottle receiving station (Fig. 9), during the continuous rotation of the series of bottle stools 61 and the series of capping heads 33, and carry the bottle head up to pick up a hot moldable disk and then enter the corresponding head 33, and thus initiate the hood capping operation at the final maximum bottle elevation, see b2, Fig. 9. The bottle is held at this elevation with its cap skirt compressed and held throughout almost a complete revolution of disk 62, until its stool supporting roll 61b, travels down the inclined discharge end 64b, of the track, and its completely hood capped bottle b3, is depressed at the hood capped bottle discharge station for removal.

The bottles to be hood capped can be placed on the stools by hand, as the empty depressed stools in succession pass the receiving station indicated by 61x, Figs. 8 and 9, and the finished hood capped bottles can be by hand removed from the bottle discharge station as the depressed loaded stools in succession pass said position indicated by 61y.

It is usual, however, to provide mechanism to successively deliver at the bottle receiving station 61x, bottles to be hood capped and means to remove the hood capped bottles from the succession of stools passing station 61y, particularly where rapid automatic operation is required to take care of the output of bottle filling and closing machinery.

In Fig. 8, and partially in Fig. 1, I show examples of feeding mechanisms for successively delivering bottles to and removing hood capped bottles from the continuously travelling bottle supporting stools 61.

In this example, a horizontal stationary table 67, is suitably supported from the machine base or otherwise at the level of the stools 61, when lowered to receive and discharge bottles, and with their edge portions over which bottles travel or slide to and from said lowered stools, in close proximity to the adjacent edges of the stools so that the bases or bottoms of the bottles can freely slide from table to stool and from stool to table.

The filled bottles to be hood capped are received by a continuously moving suitably driven endless conveyer 68, which delivers the bottles successively to the star wheel 69, horizontally arranged and continuously rotating in the same direction above the surface of table 67, on which the bottles slide, under the advancing push of the star wheel, past the spring held swingable finger 70, and along the semi-circular elevated guide wall 71. The star wheel properly spaces the advancing bottles, and delivers them successively into the path of the uniformly spaced upright pusher fingers 72, projecting upwardly through and above table 67, from an endless horizontal constantly travelling suitably driven conveyer 73, arranged below the table. The fingers 72, maintain the spacing of the bottles and push them along the table 67, guided by walls 74, and delivers the bottles in succession to the pushing jaws of star wheel 75, horizontally rotating above table 67, at the bottle receiving station 61x, of the continuously moving circle of bottle stools 61. The delivery side of star wheel 75, extends over the depressed stool 61, at its bottle receiving station and rotates in the same direction and approximately at the same speed as the circle of stools, and hence under the guidance of curved wall 76, delivers the bottles, one to each stool 61, as the stools move past the bottle receiving station, and clears each bottle thus delivered so that the stool passes on carrying its bottle. The star wheel 75, thus spaces the bottles to accord with the spacing of the stools 61, and is timed in its rotation, to function as described.

The bottle detector finger 18, is arranged in the path of the bottles while being propelled by the star wheel 69, and the long bottle path or travel from the location of detector finger 18, to the stool bottle receiving station 61x, is provided to accommodate a number of bottles equal to the number of hood cap disks in transit from the point where disk 6, receives hood caps from the supply discharge, to the point where the bottle and its moldable hood cap disk come together. From the star wheel 69, the bottles pass in regular order and are thus successively delivered to the stools as they reach station 61x, at the same speed and order, as the hood cap disks travel from the discharge from the hood cap supply to the point where the moldable disks and bottles come together, so that no disk will be delivered from the disk supply to rotary disk 6, except when a bottle moves arm or finger 18, to feed from the supply, the disk that is to be ultimately delivered to the bottle in a moldable condition.

In the example shown, the hood capped bottle discharge station b3, (Fig. 8) from the circle of advancing stools 61, is removed from the bottle receiving station 61x, but one stool intervening. The table 67, provides a slideway, leading from the bottle discharge, defined by guide walls 77, one of which has a curved bottle wiping end or deflector 77', overhanging the stools passing the discharge and in the path of the bottles advanced by said stools, to wipe the successive advancing bottles outwardly from the stool and into the path of the pusher arms of horizontally rotating star wheel 78, overhanging the path travelled by the stools and extending into the path travelled by the bottles. The star wheel delivers the bottles successively onto the table 67, and into the slideway defined by walls 77, wherein the bottles form a row that is pushed forward by each bottle delivered by the star wheel.

*The mountings for the housing 2, and rotors, the adjustments for bottles of different capacities, and the rotor drives (see Fig. 7)*

The vertical shaft 7, extends down into the base wherein the driving and transmission (not shown) is enclosed and operatively connected to the shaft lower end (not shown) to constantly rotate the same in one direction, which in the example shown, is the opposite direction from that in which rotors 32, 62, revolve.

The upper end portion of shaft 7, revolves in the bore of a central hub rigid with the top wall of the upper oven 2, and suitable bearings are provided in said hub for said shaft.

The bottom wall of the lower oven section 2' is also formed with a central hub 2d, which is slidable longitudinally on shaft 7, and in which said shaft revolves. The hub of rotor 6, is also slidable vertically of shaft 7, while constantly driven by said shaft, and for this purpose, said hub of rotor 6, is provided with a key 6d, fitting and longitudinally slidable in the longitudinally elongated keyway 7d, in shaft 7. End thrust bearings 7e, are also provided between the lower end of the hub of rotor 6, and the upper end of the hub 2d, of the bottom oven or housing section 2'. A non-rotary vertically slidable sleeve 80, concentrically surrounding shaft 7, is at its upper end fixed to hub 2d, and depends therefrom into longitudinal sliding engagement with the interior of fixed vertical hollow hub 65b, of base 65. This hub 65b, is formed with longitudinally elongated keyway 65c, in which longitudinal key 80c, carried by sleeve 80, fits in longitudinal sliding engagement to hold the sleeve against rotation.

This sleeve 80, forms a vertical column on which the rotors 32, 62, rotate and are centered.

The rotor 32, is fixed to a central vertical sleeve 81, which in effect constitutes the central bearing and supporting hub of said rotor. This sleeve 81, surrounds and rotates on the column 80, and under certain conditions is slidable vertically thereon. Thrust bearings 81d, are provided between the upper end of sleeve 81, and the lower end of the center hub of bottom oven section 2', and surrounding hub 2d. The rotor 62, is provided with a center vertical supporting sleeve or hub 62a, centered on the exterior of the lower portion of sleeve or hub 81, with a relative longitudinally sliding engagement but said two hubs 62a, 81, are confined to rotate together by key 62d, of hub 62a, fitting in longitudinal keyway 81a, of hub 81, with a longitudinal sliding fit.

The hub 62a, and its rotor 62, are upheld by the thrust bearing 62b, between the lower end of hub 62a, and the upper end of the base hub 65b.

The rotary sleeve or hub 81, and the parts upheld thereby, are supported at the desired elevation, with respect to hub 62a, by a rotary ring nut 82, surrounding hub 81, and having its longitudinal internal screw thread meshing with the external longitudinal screw thread 81b, of hub 81. The lower end of nut 82, rests on the upper end of hub 62a, preferably through the medium of a suitable end thrust bearing. Nut 82, is preferably rigid with a hand wheel 82a, of enlarged diameter whereby the nut 82, can be rotated to raise the hub 81, and its load, with respect to the hub 62a, and the bottle stools 61.

In the example shown, the rotors 62, 32, are rotated together, or as one, through key 62d, and keyway 81a, by means of gear 62c, rigid with hub 62a, which receives its power through any suitable transmission such as gear 62e (Fig. 18) coupled with the machine power and controlling transmission, not shown. The hood capping machine disclosed is designed to operate on runs of bottles wherein the bottles of a run are all of the same capacity or approximate size. When a run of bottles of a different capacity is to be handled, the machine must be adjusted to accommodate the particular bottle size. The machine disclosed is particularly intended for adjustment to handle bottles, say of quart, pint and half pint capacities, although of course the invention is not so restricted.

As the stools 61, carry the bottles whatever the sizes thereof, the differences in bottle capacities or sizes is, in this example, compensated by vertically adjusting or setting the rotors 32, and 6, and the ovens or housing 2, 2', toward and from the level of the stools 61, and this result is mainly accomplished by the rotary nut 82, which upholds rotors 32, 6, and the bottom oven or lower half 2', of the housing. When the nut 82, is rotated in a direction to lower hub 81, within hub 62a, the rotor 32, hub 2d, and the lower section 2', the housing, and the hub of rotor 6, all slide down together or as a unit, and when the nut is rotated in the opposite directions all of said parts are elevated, as a unit, with respect to hub 62a, and rotor 62.

In the particular example illustrated, to relieve nut 82, of the load of the upper oven 2, and shaft 7, the said upper oven 2, and shaft 7, are upheld in vertical adjustment, by stationary posts 65d, rigid with and upstanding from base 65, at the exterior of the machine, through the medium of exterior supporting ears 2e, rigid with the upper oven 2, and slidable vertically on posts 65d, and normally clamped rigidly thereto as by clamping screws 2f. The shaft 7, moves vertically with the upper oven 2, and hence has suitable longitudinal sliding engagement with its driving gearing (not shown). Thus when the lower oven 2', and the various rotors are carried to the desired elevation by rotation of nut 82, the lower oven 2', and rotor 6, move toward or from the upper oven 2, unless clamps 2f, are adjusted to permit the upper oven to move up and down with the lower oven and the rotors, otherwise after the lower oven and rotors are set at the desired relative positions, the upper oven is correspondingly moved vertically to operative position with respect to rotor 6, and the lower oven and then secured by clamps 2f.

It is usually desirable to provide means for indexing the nut 82, to stop the rotation thereof when the quart bottle, pint bottle, and half pint bottle or other adjustments are reached. For instance, for this purpose, we show the nut 82, carrying a radially arranged stock or locking pin 90, slidable radially of the nut through a radial slideway into the bore of the nut and constantly pressed inwardly by a spring 91, and at its exposed outer end having handle 92. The hub 81, is formed with several radial holes or sockets 93, to receive the inner end of locking pin 90, and lock the nut against rotation until the pin is withdrawn by its handle against the pressure of its spring. The sockets 93, in hub 81, are spaced any suitable number of degrees apart and at the various elevations required by the screw thread 81b, to represent the different adjustments at which the rotors are to be set for the different bottle sizes. When the parts are to be adjusted for a different bottle size, the locking pin is pulled out from the socket in which it is located, and the nut 82, is started on its revolution, and the pin is then released to slidably bear against the exterior surface of hub 81, until it reaches the next socket 93, into which it will automatically snap and lock the nut and hub 81, together. If this is not the adjustment required, the locking pin will be pulled out clear of said socket and then released and the rotation of the nut continued until the pin snaps into the next locking or indexing socket of the series of sockets.

Operation

The supply of hood cap disks a, in magazine 1, particularly those at the discharge mouth end of said magazine located down in the oven section 2, are more or less preliminarily heated by the heat from the oven and the heat of rotor 6.

The initial feeder 9a, is timed in its feeding strokes with the rate of rotation of rotor 6, and the arrival of its pockets 6a, at the cap receiving station, to deliver a hood cap disk for each pocket 6a, provided the succession of bottles advancing to the capping station is unbroken. The rotor 6, is continuously rotating and picks up caps to be heated and discharges hot moldable caps without stopping. The caps in pockets 6a are carried on a long path through the heating oven, approximately throughout a complete revolution. The rotor 6, hence always, while in operation, carries a large number of caps located in the oven in a moldable condition, and as fast as moldable caps are discharged one at a time in succession, caps for heating are received by said rotor one at a time in succession, from the cap supply.

The moldable caps discharged from rotor 6, one by one, are received by chute 30, and therein turned over and by propelling element 40, and delivered in succession one by one, in right side up position on tracks 35, in timed relation to the continuously travelling circle of uniformly spaced holding or capping heads 33, so that a moldable cap a, is delivered on floor 31, leading to tracks 35, behind the head 33, that has just passed said floor and in front of the immediately following head that is reaching said floor. The cap propelling element 40, in this instance, is operated by each advancing head 33, to assure delivery of a moldable cap to floor 31, to be carried forward with such head, and the initial cap feeder and the cap rotor 6, and its pockets, are arranged and timed in operation, to deliver moldable caps in succession to chute 30, to assure the presence of a moldable cap in chute 30, for each advancing bottle and its holding or capping head 33.

The succession of advancing bottles to be hood capped and the succession of advancing capping heads 33, are spaced and timed with the delivery of moldable caps on floor 31, so that a moldable cap *a*, will advance along tracks 35, above each advancing bottle and below the correspondingly advancing head 33, for and alined above each bottle. As hereinbefore described, each advancing bottle thereupon moves up while advancing to enter its moldable cap and lift the same from tracks 35 and force the same into its capping head 33, whereupon the cap contracting and holding presser or clamp device of said head, contracts the cap to secured or holding form on the bottle head and thus holds the same throughout a long path along which the bottle travels almost a full circle while the cap is cooling and setting. At the end of this long path, the presser or clamp device holding said skirt compressed, is opened, and the stool carrying the bottle drops to clear the hood capped bottle head from its capping head, and the bottle is thereupon discharged from its stool at the hood capped bottle discharge *b*3, Fig. 1.

We thus have almost a complete circle of spaced continuously advancing bottles moving around with the stool rotor 62, with the hood caps on the heads of said bottles tightly held under surrounding pressure while the cap skirts are setting to securing condition in secured form. The skirt of the hood cap of each bottle is thus held under tight radial pressure completely around the circle of the skirt for a substantial length of time while the bottle is advancing along an extended path leading to the hood capped bottle discharge.

The machine is designed to provide a long succession of continuously advancing hood caps in the heating and softening oven, to successively meet in a moldable condition, the continuously advancing bottles of a long line, and hence the provision of a bottle detector to break the line of advancing hood caps only when there is a break in the line of bottles advancing to successively meet the corresponding advancing hood caps, each cap predestined for a particular bottle.

The disclosure hereof is for purposes of explanation to make clear an embodiment of the invention, but not for limiting and restricting the scope of the invention except where required by the following claims when construed in the light of the prior art, for it is obvious to those skilled in the art that various departures, additions, omissions, and modifications might be resorted to without departing from the spirit and scope of the invention.

What we claim is:—

1. In hood capping machinery, in combination, mechanism for successively delivering binder carrying hood cap disks from a source of supply, and advancing a succession of said disks to and delivering them successively, in the order of their delivery from said supply, at a hood capping station including constantly rotating means for continuously advancing and spacing a multiplicity of hood cap disks in a procession and means for subjecting said procession of disks to high temperature for maintaining a supply of hood cap disks in a moldable condition; mechanism for advancing a succession of containers to be hood capped corresponding to the hood cap disks of the advancing succession, respectively, and delivering them successively at said station in timed relation with respect to the advancing succession of disks, whereby each container meets at said station a hood cap predestined therefor, a container detector situated along the container path at a point several containers remote from said station for actuation by each container on its travel to said station, and means controlled by said detector, to assure delivery of a hood cap disk at said station only where a container is advancing to ultimately meet the cap at said station.

2. In hood capping machinery, in combination, a heating oven; constantly moving mechanism for carrying and simultaneously exposing to the heat of said oven a plurality of paper material hood cap disks provided with a binder to render them moldable while constantly advancing a procession of said disks and successively discharging moldable disks for delivery at a hood capping station; means for delivering hood cap disks one at a time from a supply to said mechanism for replenishing the supply of moldable disks and for ultimate delivery at said hood capping station to meet an advancing container for which said disk is predestined; mechanism for advancing a succession of containers to be hood capped successively at said hood capping station in timed relation to the disk delivering operation of said means, whereby each container and a moldable hood cap disk will be brought together at the hood capping station; and a container detector controlling the disk delivering operation of said means to prevent delivery of a disk to said first mechanism when no container to receive said disk after being rendered moldable, is advancing in its proper order in said succession of containers.

3. In hood capping machinery, in combination, mechanism for continuously advancing from a supply a succession of paper hood cap disks rendered temporarily moldable by heat and for successively delivering temporarily moldable hood cap disks at a hood capping station; means for simultaneously heating a plurality of said disks while advancing to constantly maintain a plurality of the advancing disks moldable; mechanisms for constantly advancing a succession of containers to be hood capped and successively delivering the same at said hood capping station in timed relation to the moldable hood caps received in succession at said station, whereby each container will meet at said station a moldable hood cap disk predestined therefor; and constantly advancing means for contracting and holding the moldable disks on the containers while advancing the containers in succession from said station.

4. In combination; a heating oven; a continuously rotating conveyer for constantly advancing a plurality of binder carrying paper material hood cap disks and simultaneously subjecting the same to the heat of said oven to render them temporarily moldable; means for successively dropping cold hood cap disks to a delivering station for successively picking up by said conveyer; and mechanism whereby temporarily moldable hood cap disks are successively dropped from said conveyer to a hood capping station in the order in which said disks were delivered to said conveyer.

5. In combination; a heating oven; a continuously traveling conveyer for carrying, spacing and constantly advancing a plurality of hood cap disks in said oven with their skirt portions exposed to the heat thereof to render the same temporarily moldable and to maintain a supply of such disks in a moldable condition; means whereby temporarily moldable disks from said conveyer are successively delivered in a moldable condition at a container hood capping station; and a feeder for successively delivering cold hood cap disks to said conveyer in timed relation to the travel thereof, and without retarding the continuous advance of the conveyer.

6. In combination; a heating oven; a rotor traveling therein and provided with an endless series of hood cap disk pockets subject to the oven heat; a feeder for successively delivering hood cap disks to said pockets while said rotor is traveling; and means for successively discharging hot disks from said pockets for delivery at a hood capping station while said rotor is advancing.

7. In combination; a rotor having a series of spaced hood cap disk pockets; means to subject the disks in said pockets to heat to render them moldable whereby a constant supply of moldable disks can be maintained; means to successively deliver hood cap disks to successive pockets without retarding the rotation of the rotor; and means to successively deliver at a hood capping station temporarily moldable hood cap disks from said pockets while said rotor advances.

8. In combination; a rotor having an endless succession of hood cap disk pockets; a heating oven in which each pocket travels approximately throughout a complete revolution of the rotor whereby approximately all of the pockets are constantly in the oven; means to successively deliver hood cap disks to said pockets in succession at one end of the oven with the disk skirts in the pockets exposed to the oven heat; and means to successively discharge said pockets as they approximately reach the other end of the oven for turning over and successively delivering temporarily moldable hood cap disks right side up at a hood capping station.

9. In combination; a constantly advancing rotor having an endless succession of hood cap disk pockets; a heating oven in which each pocket travels approximately throughout a complete revolution of the rotor whereby approximately all of the pockets are constantly in the oven; a platform at one end of the oven; means to successively deposit cold hood cap disks in succession on said platform; and means to successively discharge moldable disks from said pockets as they approximately reach the other end of the oven, for successively delivering temporarily moldable hood cap disks at a hood capping station, said rotor adapted to successively pick up said cold disks from said platform as the rotor advances past the same.

10. In hood capping machinery; a rotor having an endless series of paper material hood cap disk holders, a heating oven in which said holders travel throughout approximately their complete circle of movement from a disk receiving station to a moldable disk discharge station, heating elements in said oven arranged along said path of movement, said holders arranged to support the disks with their concave sides exposed to the heat from said heating elements.

11. In hood capping machinery; a rotor having an endless marginal series of hood cap disk pockets, each opening through the rotor from one to the other side thereof, and means for subjecting the disks in said pockets to heat for rendering the same moldable.

12. In hood capping machinery; in combination; a heating oven; a continuously advancing hood cap disk conveyer enclosed in said oven for advancing and spacing a multiplicity of hood cap disks all arranged in the oven in a procession and in reversed position; said oven having a hood cap inlet; means to deliver hood cap disks in said reversed position one at a time through said inlet to said conveyer; said oven having a moldable hood cap outlet leading to a hood capping station; and means assuring discharge of moldable hood caps one by one from said conveyer and delivery thereof right side up at said hood capping station.

13. In hood capping machinery; in combination; a hood cap disk magazine; a disk platform below the discharge end of the magazine; a feeder for successively discharging disks from the magazine for deposit on the platform; a rotor arranged below the platform and having a series of disk pockets and means to sweep disks from the platform into successive pockets; means subjecting the plurality of disks carried by the rotor to heat to render the disks moldable; a hood capping station below the rotor; and means assuring delivery of moldable disks one by one from the rotor to said station.

14. In hood capping machinery; in combination; a heating oven having a hood cap disk inlet and adjacent to said inlet having a moldable hood cap disk discharge leading to a hood capping station; a rotor having an endles series of separate hood cap disk holders travelling in an endless circuit in the oven, past said inlet and outlet; means to deliver hood cap disks one by one through said inlet for deposit each in separate holders while said rotor is advancing; and means for assuring discharge of moldable disks from successive holders as they pass said outlet without retarding the advancing rotation of said rotor.

15. In hood capping machinery; in combination; a continuously advancing rotor provided with an endless series of heads, each open to receive a bottle head with a hood cap disk centered thereon and each provided with a cooperating encircling hood cap skirt contracting and pressing clamp; a support for successively receiving moldable hood cap disks establishing a hood capping station over which the heads of said series successively pass; means for successively delivering moldable hood cap disks to said support; a rotor provided with an endless series of bottle stools below and alined with said heads, respectively; means for successively elevating said stools at the hood capping station to elevate the bottle thereon to pick up a moldable disk on said support and carry the same with the bottle head into the appropriate head of said series; means to cause successive lowering of the bottles at a hood capped bottle discharge station adjacent said hood capping station; and means to cause successive contraction of said clamps as their respective heads approximately leave the hood capping station and successive expansion or opening of said clamps as their heads successively approximately arrive at said discharge station.

16. In hood capping machinery; in combination; a heating oven; a conveyer provided with a series of hood cap disk holders approximately all of which are constantly arranged in and subject to the heat of said oven; means to successively feed hood cap disks from a source of supply to said holders one by one, a rotor below said oven and provided with an endless series of hood capping heads; a moldable hood cap support at a hood capping station below said hood capping heads and receiving moldable hood cap disks one at a a time from said conveyer, said heads successively passing over said station; and means to successively elevate bottles to be hood capped at said hood capping station to pick up the moldable disks and carry them into said heads for contraction and holding on the bottle heads.

17. In hood capping machinery; means to successively deliver moldable hood cap disks at a hood capping station; a conveyer provided with a series of heads travelling in succession into operative relation to said station, each head open at the bottom to receive the mouth of a bottle that has picked up a moldable disk at said station and carried the same up into the head, each head provided with an annular ring clamp, and means for causing said clamps to contract for tightly gathering and radially pressing the moldable hood cap skirts to the bottles completely around the circumference of the skirt and thus holding the same, and to open to release the bottles at a hood capped bottle discharge station.

18. In hood capping machinery; in combination; a hood cap disk support having spaced hood cap disk tracks leading therefrom; means to successively deliver moldable hood cap disks to said support; a conveyer provided with a series of spaced heads movable in succession past said support and longitudinally of and above said tracks and each provided with means to push a moldable disk from said support and onto said spaced tracks; each head open at the bottom to receive a bottle mouth carrying a moldable disk lifted thereby from said tracks, each head provided with means to encircle and radially contract and press the depending moldable skirt of the hood cap on the bottle mouth in the head; and means to cause contraction and expansion of said means.

19. In hood capping machinery; in combination; a rotor to be continuously driven and provided with an endless series of heads, each open at the bottom to receive a bottle mouth carrying a moldable hood cap disk lifted thereby into the head, each head provided with clamping means to expand to receive the bottle mouth and disk and to permit discharge of the hood capped bottle, and to contract to gather, contract, and compress the moldable skirt of the disk against the bottle and thus hold the same until set; controlling and actuating devices for said several clamping means; a rotor below and moving with said first mentioned rotor and provided with and rotating an endless series of bottle endless series of heads for molding and clamping said disks on said bottles as said bottles are advancing.

27. In hood capping machinery, in combination; means providing a hood capping station to successively supply moldable hood cap disks to a series of bottle heads continuously moving past said station; a rotor embodying a series of hood cap clamping and molding heads to successively mold and clamp the hood caps on the bottle heads and to advance with the bottles; and mechanism for successively removing cold binder carrying hood cap disks from a source of supply and to successively deliver moldable hood cap disks at said hood capping station, said last named mechanism embodying a continuously rotating conveyer to successively receive hood cap disks and to simultaneously hold and advance a multiplicity of said disks in a procession, and means to heat the multiplicity of advancing disks to render the same moldable and to thereby maintain a supply of moldable disks for successive delivery at said hood capping station.

28. In hood capping machinery, in combination; a hood capping station; a rotor embodying a multiplicity of bottle supports adapted to continuously advance a series of bottles past said station to successively receive moldable hood cap disks therefrom; a rotor embodying a series of hood cap molding and clamping heads for successively molding said disks on said bottle head and for advancing with the bottles; a continuously rotating conveyer for successively receiving cold binder carrying hood cap disks having flaring skirts, the disks being arranged in reversed position, said conveyer adapted to simultaneously carry and advance a plurality of said disks in a procession, means to heat said plurality of advancing disks to render the same moldable for maintaining a supply of moldable disks; and means to successively deliver moldable disks from said conveyer to said station and for turning over each disk and delivering the same right side up at said station.

29. In hood capping machinery, in combination; a rotor for carrying and advancing a succession of bottles to be hood capped; a holder at a stationary location for a moldable hood cap disk, said holder being common to said advancing succession of bottles and adapted to hold successive moldable hood caps in the path of successive bottle heads of said succession to be engaged thereby and removed therefrom with the cap on the bottle head; a series of heads corresponding to and advancing with said series of bottles to successively cooperate with the bottle heads and the moldable caps thereon to mold and annularly contract the moldable caps on the bottle heads and thus hold them while advancing until set in secured condition; and mechanism for heating and maintaining a succession of a multiplicity of binder carrying hood caps in moldable condition to maintain a supply of moldable caps and for successively delivering moldable caps to said holder for picking up therefrom by the bottle heads.

Signed at Fulton, Oswego County, New York, this 29th day of April, 1929.

WILBUR L. WRIGHT.
LEE D. PIERCE.